United States Patent
Ikeda

(10) Patent No.: US 9,707,906 B2
(45) Date of Patent: Jul. 18, 2017

(54) SOUNDPROOF MATERIAL FOR VEHICLE AND WIRE-HARNESS ASSEMBLY

(71) Applicant: YAZAKI CORPORATION, Tokyo (JP)

(72) Inventor: Kei Ikeda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/143,249

(22) Filed: Apr. 29, 2016

(65) Prior Publication Data

US 2016/0355148 A1 Dec. 8, 2016

(30) Foreign Application Priority Data

May 8, 2015 (JP) .................. 2015-095546

(51) Int. Cl.
*G10K 11/168* (2006.01)
*B60R 13/08* (2006.01)
*B32B 5/18* (2006.01)

(52) U.S. Cl.
CPC ............ *B60R 13/0815* (2013.01); *B32B 5/18* (2013.01); *G10K 11/168* (2013.01); *B32B 2307/102* (2013.01); *B32B 2605/00* (2013.01)

(58) Field of Classification Search
CPC . B60R 13/0815; B32B 5/18; B32B 2307/102; B32B 2605/00; G10K 11/168
USPC ................................. 181/290, 284
See application file for complete search history.

(56) References Cited

U.S. PATENT DOCUMENTS

| 6,000,959 A * | 12/1999 | Curtindale ........... B60R 16/0207 439/246 |
| 2007/0137926 A1* | 6/2007 | Albin .................. B60R 13/0815 181/290 |
| 2009/0310812 A1* | 12/2009 | Close .................. B60R 11/0217 381/389 |
| 2010/0213002 A1* | 8/2010 | Oboodi ...................... B32B 5/02 181/290 |
| 2011/0139542 A1* | 6/2011 | Borroni ................... B32B 3/266 181/290 |
| 2012/0279799 A1* | 11/2012 | Graf .................... B60R 13/0838 181/290 |
| 2013/0118831 A1* | 5/2013 | Kawai .................. G10K 11/168 181/290 |
| 2016/0176368 A1 | 6/2016 | Osada et al. |

FOREIGN PATENT DOCUMENTS

| JP | 2005-120247 A | 5/2005 |
| JP | 2006-240207 A | 9/2006 |
| JP | 2015-67085 A | 4/2015 |

OTHER PUBLICATIONS

Japanese Office Action for the related Japanese Patent Application No. 2015-095546 dated May 16, 2017.

* cited by examiner

*Primary Examiner* — Forrest M Phillips
(74) *Attorney, Agent, or Firm* — Kenealy Vaidya LLP

(57) ABSTRACT

A soundproof material for a vehicle having partially different sound absorption characteristic is provided. In the soundproof material for the vehicle, a sheet-like body is partially laminated on at least one surface of a flexible porous body formed in a plate-shape or an approximately plate-shape.

9 Claims, 6 Drawing Sheets

SOUNDPROOF MATERIAL FOR VEHICLE AND WIRE-HARNESS ASSEMBLY

TECHNICAL FIELD

The present invention relates to a soundproof material for vehicle which is arranged between an interior of a vehicle and an exterior thereof, and prevent intrusion of a sound from outside into vehicle interior, and a wire harness assembly in which a wire harness is assembled on the soundproof material for vehicle.

BACKGROUND OF THE INVENTION

In order to quietly keep an interior of a vehicle from a vehicle exterior sound (including sounds generated from tires of running vehicle and engine thereof), porous material or composite material formed by adhering a sheet-like skin made of resin to fibrous material such as flexible polyurethane foam or felt is arranged on the back side of a member constructing a wall of vehicle interior (Patent Literatures 1 and 2).

Here, it is known that a sound absorbency of porous material becomes high in a high frequency region (See FIG. 6A), and a sound absorbency of membrane material becomes high in resonance frequency of membrane. In other words, in porous material a sound absorbency of a low frequency region is low, and in membrane material it is difficult to obtain a sound absorbency in a wide range of frequency region. When simply combining them, as shown in a model view of FIG. 6B, a sound absorption characteristic of a membrane vibration type is dominant, and thereby combination effect with a sound absorption characteristic of a porous type shown in FIG. 6A can not be expected.

Also, for example, a sound absorption characteristic of a frequency region of a motor is high in a portion near the motor, and a sound absorption characteristic of a frequency region of tire noise is high near tire. Furthermore, in a portion in which wind noise is likely to occur, a sound absorption characteristic according to the wind noise is high. For this reason, a request of soundproof material for vehicle having a partially different sound absorption characteristic is expected.

Patent Literature 1: JP 2006-240207 A
Patent Literature 2: JP 2005-120247 A

SUMMARY OF THE INVENTION

The present invention improves the above problem. More specifically, an object of the present invention is to provide a soundproof material for a vehicle in which a partially different sound absorption characteristic is able to be anticipated and a wire harness assembly in which a wire harness is assembled in the soundproof material for the vehicle.

To solve the above problem, a soundproof material for vehicle of the present invention has a sheet-like body partly laminated on at least one surface of a flexible porous body formed in a plate-shape or an approximately plate-shape.

In the soundproof material for the vehicle of the present invention, a plurality of through holes is provided on at least a part of the sheet-like body.

The plurality of the through holes include two or more kinds of through holes having different shape from each other.

A wire harness assembly of the present invention has a wire harness arranged inside of the soundproof material for the vehicle.

In the wire harness assembly of the present invention, the wire harness is arranged in a lamination surface of the porous body and the sheet-like body.

According to the soundproof material for the vehicle of the present invention, the sheet-like body is partly laminated on one surface of the flexible porous body which formed in the plate-shape or the approximately plate-shape. Therefore, it is possible to combine a portion which can silence a specific frequency range by the sheet-like body with a portion which can silence a relatively high frequency range by the flexible porous body as appropriate, and thereby partially different sound absorption characteristics can be expected.

According to the soundproof material for the vehicle of the present invention, a plurality of through holes is provided on at least a part of the sheet-like body. Therefore, it is possible to adjust the sound absorption characteristics.

The plurality of the through holes include two or more kinds of through holes having different shape each other. Therefore, the through hole of the necessary shape can be arranged at necessary places, and it is possible to adjust the fine sound absorption characteristics.

Furthermore, the wire harness is arranged inside of the soundproof material for the vehicle. Thereby, the wire harness assembly can be installed at the same time as the soundproof material for the vehicle is installed in place. Thus, work efficiency for the vehicle body can be improved.

Furthermore, the wire harness is arranged in the lamination surface of the porous body and the sheet-like body. Thereby, assembling work of the wire harness can be easily.

BRIEF DESCRIPTION OF THE DRAWINGS

FIG. 1A is a view showing a state of assembling a wire harness;

FIG. 1B is a view showing a state after assembling the wire harness;

FIG. 1C shows a sound absorption characteristic of a porous type;

FIG. 1D shows a sound absorption characteristic of a membrane vibration type;

FIG. 1E is a combination example of a sound absorption characteristic of a porous type and a sound absorption characteristic of a membrane vibration type;

FIG. 1F is another combination example of a combination example of a sound absorption characteristic of a porous type and a sound absorption characteristic of a membrane vibration type that is different from FIG. 1E;

DESCRIPTION OF THE PREFERRED EMBODIMENT

Figure 1A:
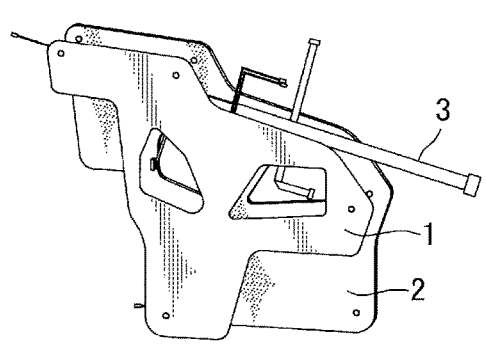
FIGS. 1A through 1F are model views showing one example of a wire harness assembly of the present invention. In particular.
Figure 1B:
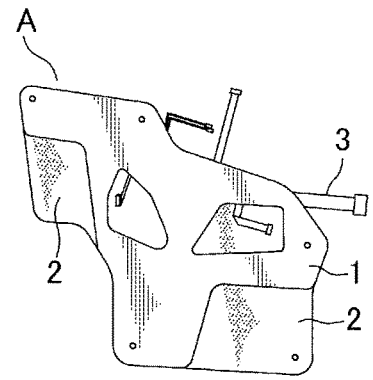

FIGS. 1A to 1B are model drawings showing one example A of a wire harness assembly of the present invention, and FIGS. 1C to 1F are explanatory drawings for a sound absorption characteristic thereof.

Figure 2A:
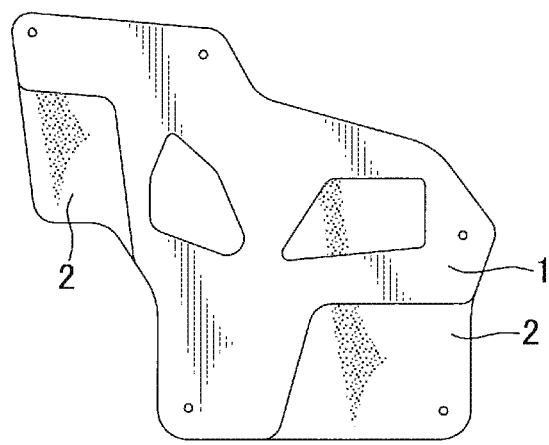
FIGS. 2A-2C are model views showing examples of three types in which lamination states of the sheet-like body and the porous body are different from each other.
Figure 2B:
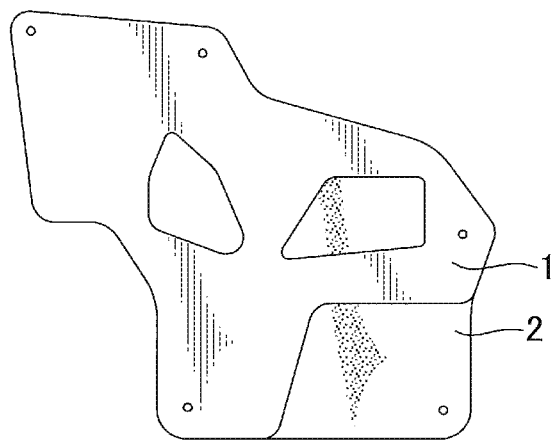

FIG. 1A shows a state before assembling a wire harness, and FIG. 2B shows a state after assembling a wire harness. In FIG. 1B, a sheet-like body 1 is laminated on a part of one surface of a substantially plate-like flexible porous body 2 (Hereafter, simply referred to as "porous body") in this example. A wire harness 3 composed of a flat cable and a group of electric wires between the porous body 2 and the sheet-like body 1.

The porous body 2 and the sheet-like body 1 are bounded together and integrated. Therefore, by only incorporating a wire harness assembly A in a vehicle body, assembly of the wire harness 3 into the vehicle body is finished, and thereby it is possible to improve work efficiency around the vehicle body. Further, the exterior member and the fixed member can be omitted, and thereby it is possible to reduce weight and cost. Furthermore, in FIG. 1B, a portion of the porous body 2 in which the sheet-like body 1 is not laminated is shown.

Figure 1C:
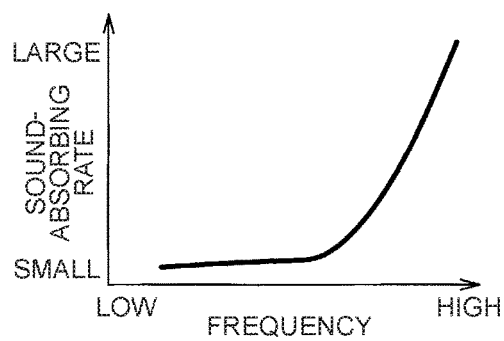
Figure 1D:
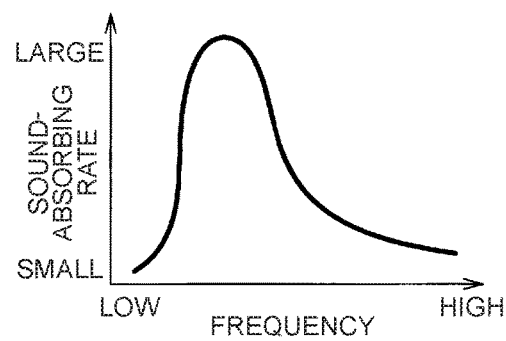
Figure 1E:
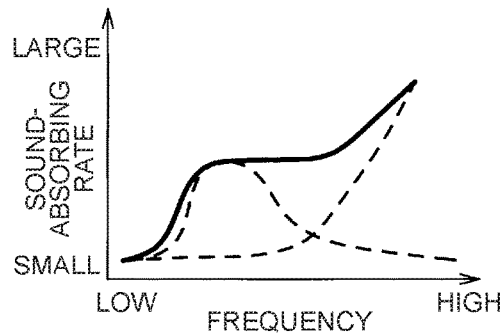
Figure 1F:
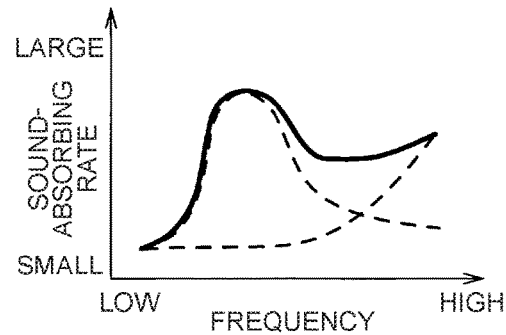

Here, a sound absorption characteristic of the wire harness assembly A will be explained. In FIG. 1C, a sound absorption characteristic of a porous type of the porous body 2 is shown, and In FIG. 1D a sound absorption characteristic of a membrane vibration type on the sheet-like body 1 is shown. At that time, according to the size of a lamination area in which the sheet-like body 1 and the porous body 2 are laminated or place of the lamination area, for example, it is possible to combine the sound absorption characteristic of the porous type with the sound absorption characteristic of the membrane vibration type as shown in FIG. 1E by a solid line, and to combine both sound absorption characteristics as shown in FIG. 1F by a solid line. Also, a solid line in FIG. 1E indicates a sound absorption characteristic in a portion near an area where the sheet-like body is not laminated (influence of a sound absorption characteristic of a membrane vibration type is small). A solid line in FIG. 1F indicates a sound absorption characteristic in a portion near an area where the sheet-like body is laminated (influence of a sound absorption characteristic of a membrane vibration type is large).

Also, in FIGS. 1A and 1B, examples of the wire harness assembly are shown. When the porous body and the sheet-like body are laminated without the wire harness, they are a soundproof material for a vehicle. Hereafter, they are referred to as "a soundproof material for vehicle" including them.

Next, a setting example of area where the porous body and the sheet-like body are laminated is shown in FIGS. 2A and 2B. In FIG. 2A, an example of area where the sheet-like body 1 is not laminated on both bottom in figure of the porous body 2 is shown. In FIG. 2B, an example of area where the sheet-like body 1 is not laminated on bottom ends of the left and right in figure of the porous body 2 is shown.

Figure 2C:
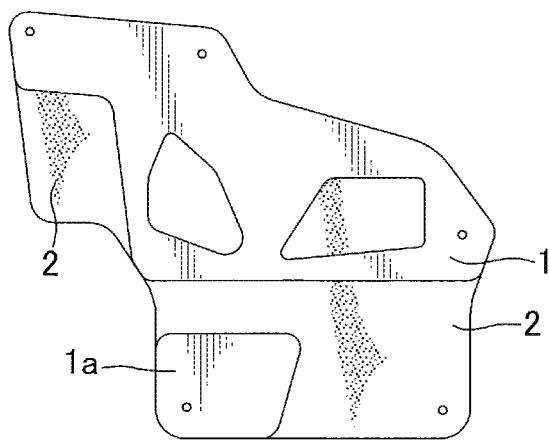

Furthermore, in FIG. 2C, an example that an area in which the sheet-like body 1 is not laminated is provided at the bottom and left-end bottom of drawing of the porous body 2 and an area in which the sheet-like body 1 is laminated is provided at the left bottom is shown. Also, the sheet-like body 1a may be laminated in the same as the sheet-like body 1. Further, the sheet-like body 1a having different thickness or different construction material may be laminated. Furthermore, the sheet-like body divided into two or more may be used.

As the porous body used in the present invention, a foam having open-cell that for example composed of polyurethane resin (polyurethane rubber), silicon resin (silicon rubber) and so on is mentioned. If the porous body is a closed cell not having open-cell, sufficient sound absorbing performance can not be ensured.

Their quality of material or thickness of the porous body and size and the cell ratio of the bubble affects the sound absorbing performance of the soundproof material for the vehicle. For this reason, the porous body 2 is produced by appropriately adjusting molding condition when forming the porous body (base resin type, kind and amount of the used blowing agent, and molding temperature), or the processing conditions after molding.

In addition, as the flexible porous body in the present invention, non-woven fabric (including felt) composed of fiber such as polypropylene or polyester (polyethylene terephthalate) may be used. In this case, the thickness of non-woven fabric or a base weight thereof is appropriately selected.

As the sheet-like body used for the present invention, the sheet-like body composed of vinyl chloride resin, polyethylene, polypropylene, polystyrene, and various elastomers, etc., and a sheet-like body of foam consisting made of their raw material is mentioned. Furthermore, when the sheet-like body of foam is used, a foam is preferable to consist of closed cells because high sound-absorbing performance can be obtained.

The quality of material or thickness of the sheet-like body affects the sound absorbing performance of the soundproof material for the vehicle. Therefore, the quality of material or thickness of the sheet-like body is appropriately selected in order to obtain desired sound absorbing performance.

In the soundproof material for the vehicle of the present invention, the sheet-like body can be laminated on one surface of the porous material or both surfaces thereof. In this case, laminated region may not be matched in the both surfaces. Further, sheet-like body types may be different, and the sheet-like body may be appropriately laminated according to the required sound absorbing performance. Moreover, the sheet-like body itself may be laminated all over the whole, or a plurality of the sheet-like bodies may be partially overlapped. In this case, each different sheet-like bodies may be overlapped.

In at least a part of area of the sheet-like body used in the present invention, a plurality of through holes can be provided. The size and arrangement density of the through hole (aperture ratio is set from these) affects the sound absorbing performance of the soundproof material for the vehicle. For this reason, the size and arrangement density of the through hole is appropriately decided in order to obtain desired sound absorbing performance. Here, for example, when the through hole is formed in circular shape, the diameter of the through hole may be equal to or greater than 2.5 mm and equal to or less than 10 mm, and the distance between the through holes may be equal to or greater than 10 mm and equal to or less than 100 mm in order to ensure an excellent sound-absorbing performance. In this case, the aperture ratio of area in which the through hole is arranged is equal to or greater than 1% and is equal to or less than 40%. Further, when the through hole is not formed in circular shape, the diameter corresponding to circular may be equal to or greater than 2.5 mm and equal to or less than 10 mm in order to ensure an excellent sound-absorbing performance.

Figure 3A:
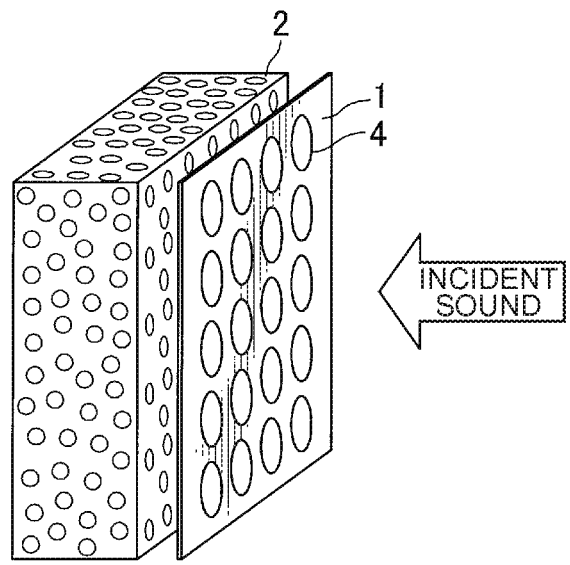
FIG. 3A is a model view of a laminated product in which a sheet-like body including a plurality of through holes and a porous body are laminated.
Figure 3B:
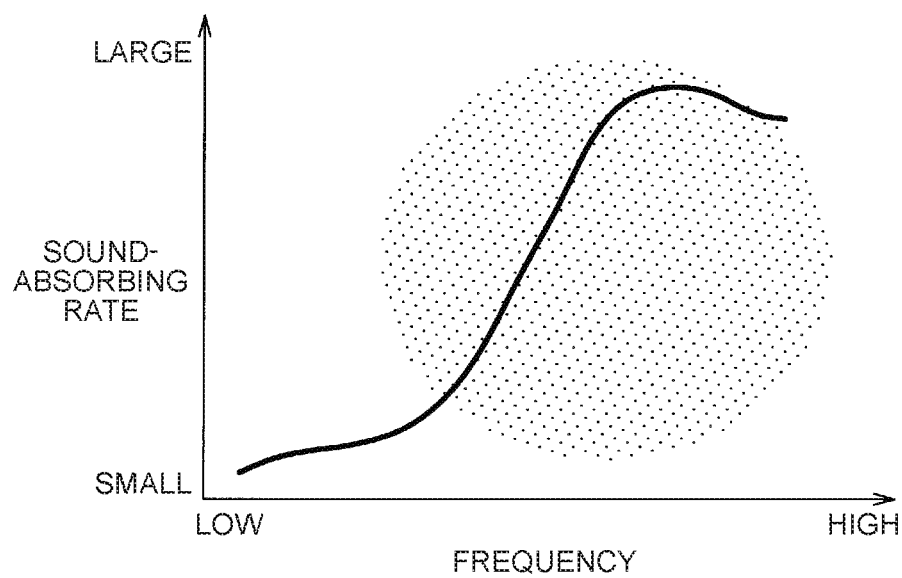
FIG. 3B shows one example of the sound absorption characteristic of the laminated product.

In FIG. 3A, a model view of a laminated product, in which the sheet-like body 1 including a plurality of through holes 4 and the porous body 2 are laminated, is shown. In FIG. 3B, one example of the sound absorption characteristic of the laminated product is shown. Such the laminated product can have both the sound absorption characteristic of the membrane vibration type and the sound absorption characteristic of the porous type, and can be a sound absorbing for wide range from a low-frequency region to a high-frequency region. Therefore, if providing the sound absorption characteristic for the wide range in the soundproof material for the vehicle, it is possible to respond to that situation by arranging a plurality of the through holes in the sheet-like body. Also, the sound absorption characteristic can be adjusted by the size of the through hole or arrangement density thereof.

Figure 4A:
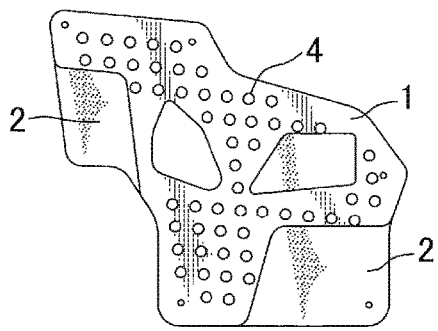
FIGS. 4A-4D are model views showing an example of the soundproof material for the vehicle in which the sheet-like body including a plurality of through holes and a porous body are laminated.
Figure 4E:
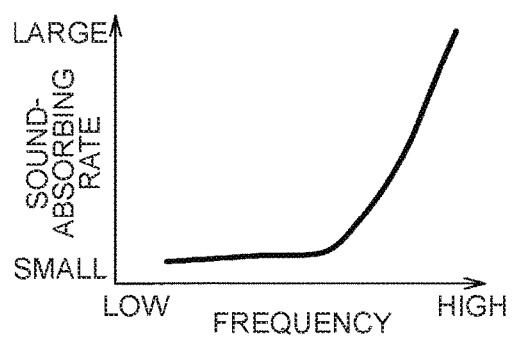
FIGS. 4E-4G show sound absorption characteristics.
Figure 4B:
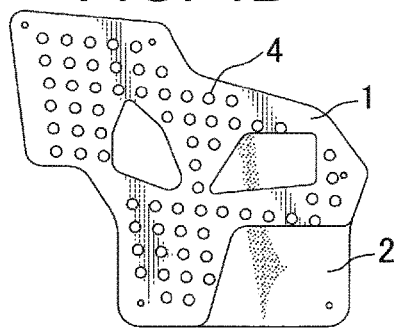

In FIGS. 4A-4G, an example of the soundproof material for the vehicle using the sheet-like body in which the plurality of through holes are provided is shown. In FIG. 4A, an example that the through hole 4 is provided in the whole of the sheet-like body shown in FIG. 2A is shown. In FIG. 4B, an example that the through hole 4 is provided in the whole of the sheet-like body shown in FIG. 2B is shown.

Figure 4F:
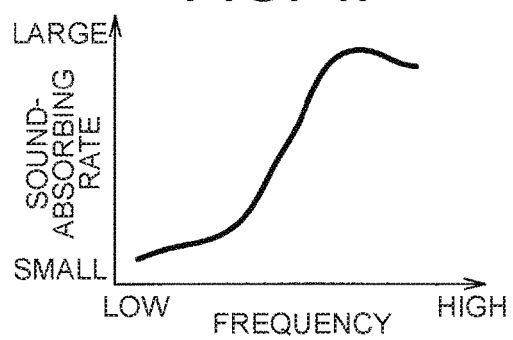
Figure 4C:
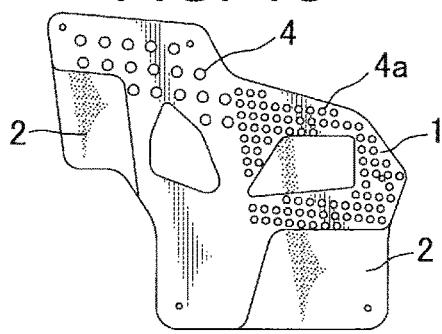
Figure 4G:
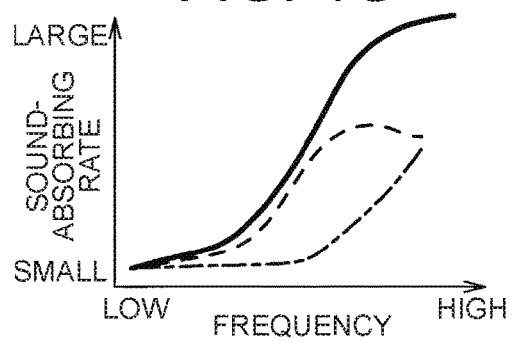
Figure 4D:
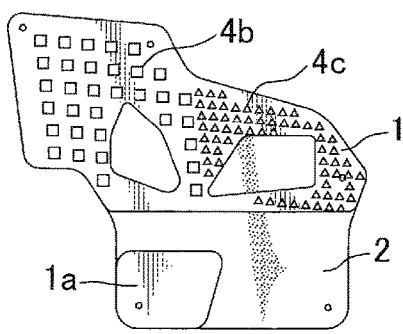

In the soundproof material for vehicle of the present invention, the through hole can be arranged in only a part of area of the sheet-like body rather than the entire sheet-like body. An example like that is shown in FIGS. 4C and 4D. FIG. 4C is an example that two types circular through holes 4 and 4a having different diameters from each other are separately provided in a left and right area of upper side of the sheet-like body 1 shown in FIG. 2A. FIG. 4D is an example that a quadrangular through hole 4b and a triangular through hole 4c in which area is smaller than the through hole 4b are separately provided in a left and right area of the sheet-like body 1 shown in FIG. 2C. In this way, when the through hole is provided, it is possible to provide it different in size or shape each other. Furthermore, by changing the conduction for providing the through hole in this manner, the sound absorption characteristic of the porous type shown in FIG. 4E and the composite sound absorption characteristic compounding the sound absorption characteristic of the porous type with the sound absorption characteristic of the membrane vibration type shown in FIG. 4F are compounded, and thereby the sound absorption characteristic can be obtained as shown in FIG. 4G by a solid line (In FIG. 4G, the broken line shows the sound absorption characteristic of the porous type, and the dashed line shows the composite sound absorption characteristic compounding the sound absorption characteristic of the porous type with the sound absorption characteristic of the membrane vibration type).

Figure 5A:
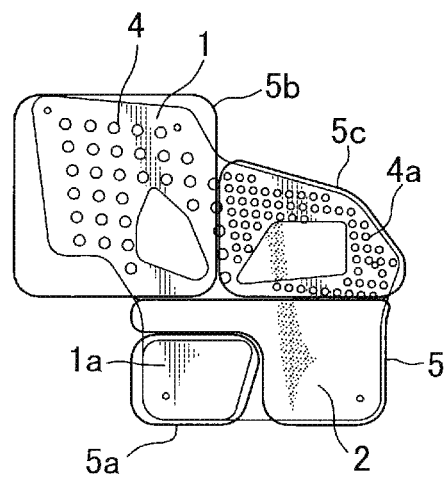
FIGS. 5A and 5C are model views showing an example of the soundproof material for the vehicle in which a sheet-like body including two types of through holes and a porous body are laminated.
Figure 5B:
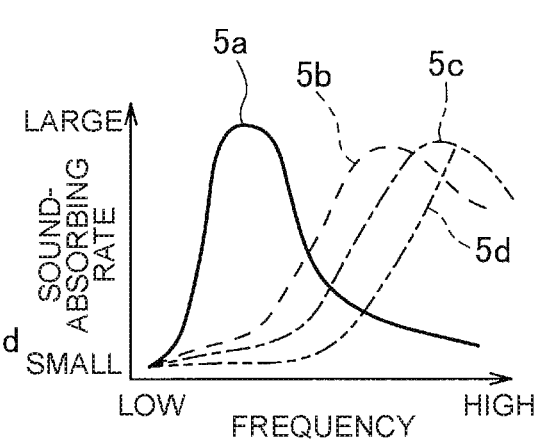
FIG. 5B shows sound absorption characteristics.

Furthermore, each sound absorption characteristic of areas 5a-5f in the example of the soundproof material for the vehicle shown in FIG. 5A is shown in FIG. 5B as a model. In the area 5a, the sheet-like body 1 in which the through hole is not provided is laminated. In the area 5b, a relatively large circular through hole 4 is provided on the laminated sheet-like body 1. In the area 5c, a relatively small circular through hole 4a is provided on the limited sheet-like body. In the area 5d, the sheet-like body 1 is not laminated.

In this way, various sound absorption characteristic can be obtained by appropriately selecting the presence or absence of the lamination of the sheet-like body, the presence or absence of the through hole, or the shape of the through hole.

Figure 5C:
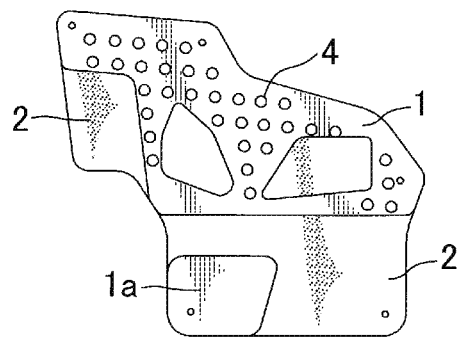
Figure 6A:
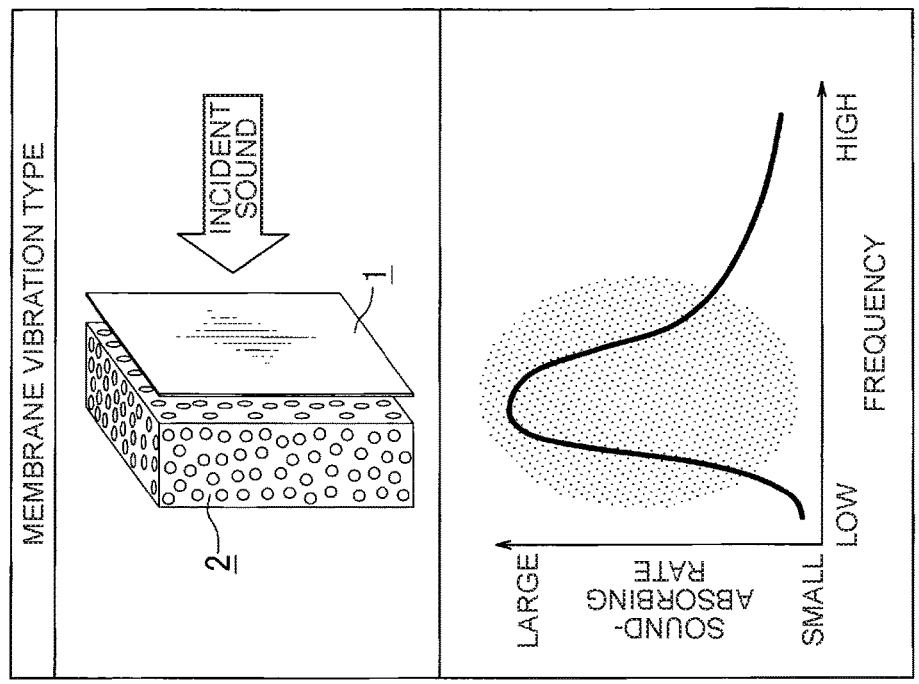
FIGS. 6A and 6B are model views for illustrating a sound absorption characteristic of a porous type and a sound absorption characteristic of a membrane vibration type, respectively.
Figure 6B:
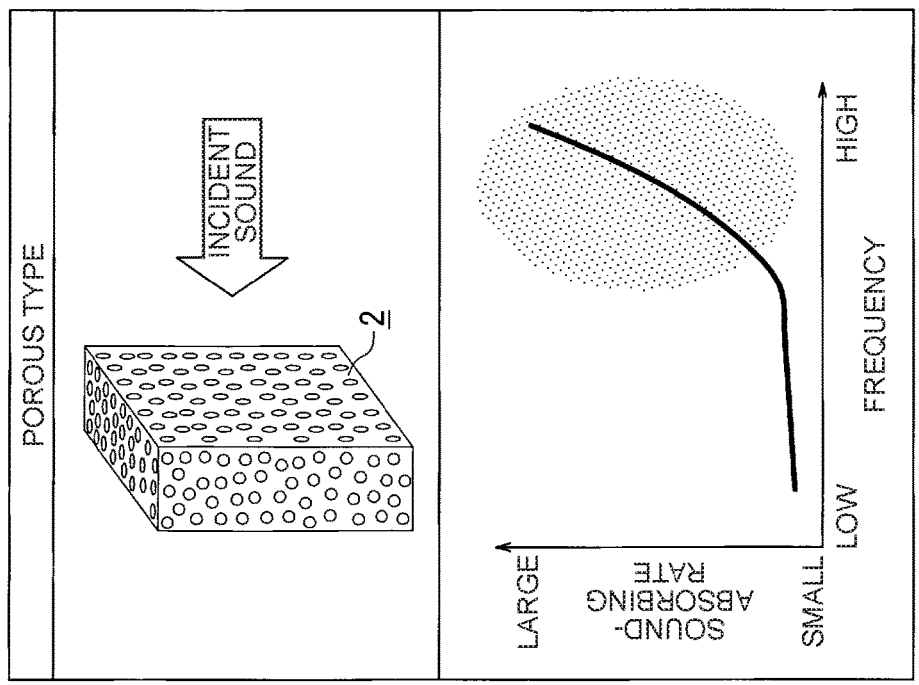

Further, in FIG. 5C, an example of the soundproof material for vehicle having a round-shaped through hole 4 in the sheet-like body 1 shown in FIG. 2C.

The soundproof material for the vehicle of the present invention can be used for a door trim. Further, it may be used for a roof, instrument panel, floor and so. Also, the soundproof material for the vehicle of the present invention has the above soundproof effect by its structure as well as a heat-shielding effect for preventing heat and cold from entering in the vehicle room.

The present invention is explained in reference to preferred embodiments, but the soundproof material for the vehicle of the present invention and the wire harness assembly are not limited thereto.

The soundproof material for the vehicle of the present invention and the wire harness assembly can be appropriately changed by a person skilled in the art. Various change and modifications can be made with the scope of the present invention.

REFERENCE SIGNS LIST 1, 1a sheet-like body
2 porous body
3 wire harness
4, 4a, 4b, 4c through hole

What is claimed is:
1. A soundproof material for a vehicle comprising:
a flexible porous body having a plate-shape or an approximately plate-shape, and including at least one surface, the at least one surface including a first area and a second area abutting the first area along a border; and
a sheet-like body laminated on the first area of the flexible porous body and the sheet-like body terminating at the border such that the second area is exposed.
2. The soundproof material for the vehicle according to claim 1, wherein a plurality of through holes is provided on at least a part of the sheet-like body.
3. The soundproof material for the vehicle according to claim 2, wherein the plurality of the through holes include two or more kinds of through holes having a different shape from each other.
4. A wire harness assembly comprising:
a wire harness arranged inside of the soundproof material for the vehicle according to claim 1.
5. A wire harness assembly comprising:
a wire harness arranged inside of the soundproof material for the vehicle according to claim 2.
6. A wire harness assembly comprising:
a wire harness arranged inside of the soundproof material for the vehicle according to claim 3.
7. The wire harness assembly according to claim 4, wherein the wire harness is laminated between the porous body and the sheet-like body.
8. The wire harness assembly according to claim 5, wherein the wire harness is laminated between the porous body and the sheet-like body.

9. The wire harness assembly according to claim 6, wherein the wire harness is laminated between the porous body and the sheet-like body.

\* \* \* \* \*